(12) United States Patent
Ezrielev et al.

(10) Patent No.: US 12,301,584 B2
(45) Date of Patent: May 13, 2025

(54) SYSTEM AND METHOD FOR SECURITY MANAGEMENT IN DISTRIBUTED SYSTEMS

(71) Applicant: Dell Products L.P., Round Rock, TX (US)

(72) Inventors: Ofir Ezrielev, Be'er Sheva (IL); Yehiel Zohar, Sderot (IL); Lee Serfaty, Be'er Sheva (IL)

(73) Assignee: Dell Products L.P., Round Rock, TX (US)

( * ) Notice: Subject to any disclaimer, the term of this patent is extended or adjusted under 35 U.S.C. 154(b) by 205 days.

(21) Appl. No.: 18/308,246

(22) Filed: Apr. 27, 2023

(65) Prior Publication Data

US 2024/0364699 A1    Oct. 31, 2024

(51) Int. Cl.
*H04L 9/40* (2022.01)

(52) U.S. Cl.
CPC .................. *H04L 63/105* (2013.01)

(58) Field of Classification Search
CPC .................. H04L 63/105
See application file for complete search history.

(56) References Cited

U.S. PATENT DOCUMENTS

| | | | | |
|---|---|---|---|---|
| 8,336,100 | B1 * | 12/2012 | Glick | G06F 21/577 |
| | | | | 713/153 |
| 9,740,859 | B2 * | 8/2017 | Harris | H04L 63/02 |
| 10,735,203 | B2 | 8/2020 | Reddy | |
| 11,438,369 | B2 | 9/2022 | Schwartau | |
| 11,886,557 | B1 | 1/2024 | Thanh Tran | |
| 11,973,878 | B2 | 4/2024 | Young | |
| 2013/0347094 | A1 * | 12/2013 | Bettini | H04L 63/1433 |
| | | | | 726/11 |
| 2016/0350531 | A1 * | 12/2016 | Harris | H04L 63/20 |
| 2018/0069849 | A1 * | 3/2018 | Kraemer | H04L 63/105 |
| 2019/0109717 | A1 * | 4/2019 | Reddy | H04L 63/1433 |
| 2019/0312906 | A1 * | 10/2019 | Schwartau | H04L 63/14 |
| 2020/0136838 | A1 | 4/2020 | Kucharski et al. | |
| 2023/0179422 | A1 * | 6/2023 | Young | G06F 16/27 |
| | | | | 726/5 |
| 2024/0146756 | A1 | 5/2024 | Debenedetti | |

FOREIGN PATENT DOCUMENTS

| | | |
|---|---|---|
| CN | 112861106 A | 5/2021 |
| CN | 117082515 A | 11/2023 |
| CN | 117354023 A | 1/2024 |
| JP | 2004179724 A | 6/2004 |

\* cited by examiner

*Primary Examiner* — J. Brant Murphy
(74) *Attorney, Agent, or Firm* — WOMBLE BOND DICKINSON (US) LLP

(57) ABSTRACT

Methods and systems for securing distributed systems are disclosed. The distributed systems may include data processing systems subject to compromise by malicious entities. If compromised, the data processing systems may impair the services provided by the distributed system. To secure the distributed systems, the data processing systems may implement a security framework. The security framework may utilize a hierarchy that defines authority for validating trusted entities. The hierarchy may vest authority across the distributed system, and may be based on a reputation (e.g., weighted reputation) of each of the data processing systems within the distributed system. Consequently, the impact of compromise of a data processing system may be limited by the distributed authority.

20 Claims, 12 Drawing Sheets

SYSTEM AND METHOD FOR SECURITY MANAGEMENT IN DISTRIBUTED SYSTEMS

FIELD

Embodiments disclosed herein relate generally to security. More particularly, embodiments disclosed herein relate to systems and methods to secure distributed systems.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
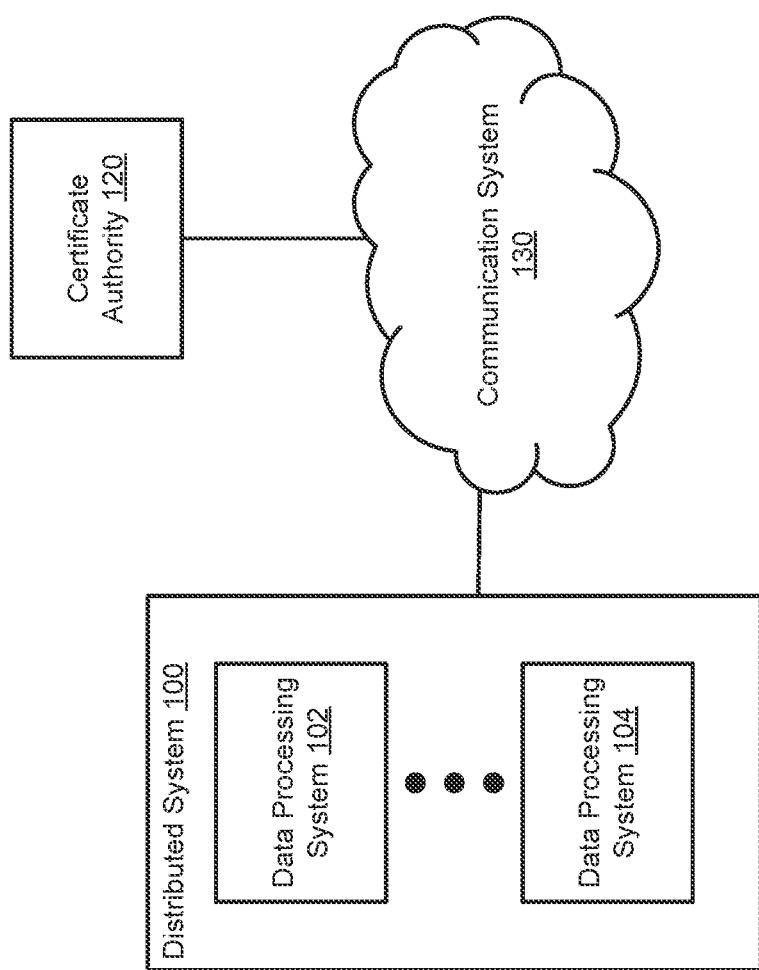
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing distributed system. The distributed systems may include data processing systems that may provide any number and type of computer implemented services. Malicious entities may attempt to compromise the data processing systems. While described below with respect to malicious entities, it will be appreciated that the operation of data processing systems may be compromised due to other reasons (e.g., errors in operation) without departing from embodiments disclosed herein.

To manage risks of compromise, the data processing systems of the distributed system may implement a security framework. The security framework may distribute authority for validating entities to a variety of different data processing systems. The security framework may utilize a hierarchy of the data processing systems to define which data processing system has authority with respect to other data processing systems. Data processing systems higher in the hierarchy may have authority over data processing systems that are lower in the hierarchy.

When data processing systems of the distributed system are compromised, the hierarchy may be used to identify other data processing systems that may be impacted by the compromised data processing systems. The identified data processing systems may be remediated. If the remediations are unsuccessful, the confirmed compromised data processing systems may be excluded from the hierarchy. Exclusion from the hierarchy may render the data processing systems as untrusted to the remaining data processing systems. Consequently, the confirmed compromised data processing systems may be excluded from continuing influence on the distributed system.

The hierarchy of the distributed system (also referred to herein as "distributed system hierarchy") may be established using, at least, a weighted reputation score (also referred to herein simply as a "weighted reputation") of each data processing system making up the distributed system. The weighted reputation of a data processing system may be affected by (e.g., calculated using) factors such as, but not limited to: seniority, adherence to rules, stability of traffic, etc. Data processing systems with higher (e.g., larger) weighted reputations are deemed more reliable and thus arranged higher within the hierarchy (e.g., may be used as a root data processing system (e.g., a root node) and/or may be located closer to the root node). More reliable data processing systems may also be used to sign (e.g., authenticate/certify) more of the other data processing systems within the distributed system while less reliable data processing systems may be configured to sign less amounts of other data processing systems. Such a hierarchy that prioritizes less risky data processing systems (e.g., data processing systems with higher weighted reputations that are less likely to fail an authentication by another data processing system) advantageously improves the stability of the above-discussed data processing system authentication process.

Thus, embodiments disclosed herein may address, among others, the technical problem of resource cost for security in distributed systems. By implementing the framework, the resource cost for securing the distributed systems may be reduced. By distributing authority for validation of trusted entities across the distributed system, the impact of compromises on the system may be limited. Thus, the resource cost for subsequent remediations of the distributed system may also be reduced. Accordingly, a system in accordance with embodiments disclosed herein may more efficiently marshal limited computing resources of system through reduce resource expenditures for securing the distributed system.

In an embodiment, a method for managing security of a distributed system is provided. The method may include obtaining data processing systems information for data processing systems of the distributed system; using the data processing systems information to generate a weighted reputation for each of the data processing systems; generated a hierarchy for the distributed system based on the weighted reputations; using the hierarchy to validate authority of the data processing systems in the distributed system; and based on the validated authority, providing computer implemented services.

The data processing systems information may include operational data and specification data of each of the data processing systems. The operational data may include a total run time, a traffic rate, a traffic latency, and an operating rule adherence rate of each of the data processing systems.

A first data processing system of the data processing systems may have a higher one of the weighted reputation than a second data processing system among of the data processing systems is higher within the hierarchy than the second data processing system.

The method may also include, after using the hierarchy in the distributed system: identifying a compromised data processing system of the data processing systems of the distributed system; identifying a portion of the data processing systems that may be also compromised based on a representation of the data processing systems in the hierarchy; revising the hierarchy based on the portion of the data processing systems and the compromised data processing system to obtain a revised hierarchy; refreshing security data for the data processing systems using the revised hierarchy; and verifying communications obtained by the data processing systems using the refreshed security data.

The data processing systems may implement a security framework based on the hierarchy, the security framework vesting security authority in each data processing system of the data processing systems over a portion of the data processing systems that are all lower in the hierarchy.

The hierarchy is may also be based on a spanning tree for the data processing systems, and the portion of the data processing systems are associated with child nodes of a node of the spanning tree associated with the data processing system that is vested with the security authority.

The spanning tree may be based on communication links established by the data processing systems through formation of a mesh network.

Verifying the communications may include, for a communication of the communications sent by a sending entity: identifying, by a receiving data processing system of the data processing systems that received the communication, an authoritative data processing system of the data processing systems using the revised hierarchy; making a determination regarding whether the entity is trusted using a portion of the refreshed security data associated with the authoritative data processing system; in a first instance of the determination where the entity is trusted: servicing the communication; and in a second instance of the determination where the entity is not trusted: rejecting the communication.

In an embodiment, a non-transitory media is provided. The non-transitory media may include instructions that when executed by a processor cause the method to be performed.

In an embodiment, a data processing system is provided. The data processing system may include the non-transitory media and a processor, and may initiate performance of the method when the computer instructions are executed by the processor.

Turning to FIG. 1, a block diagram illustrating a system in accordance with an embodiment is shown. The system shown in FIG. 1 may provide computer-implemented services. The computer implemented services may include any type and quantity of computer implemented services. For example, the computer implemented services may include data storage services, data acquisition services, and/or any other type of service that may be implemented with a computing device.

To provide the computer implemented services, the system of FIG. 1 may include distributed system 100. Distributed system 100 may include any number of data processing systems 102-104 that provide the computer implemented services. The data processing systems may cooperatively provide the computer implemented services.

The data processing systems of distributed system 100 may be geographically distributed and communicate with one another via wired and/or wireless networks. The geographic distribution and communications may present risks to the computer implemented services. For example, malicious entities (not shown) may attempt to interfere with the operation of any of the data processing systems. To do so, the malicious entities may communicate with the data processing systems. The communications may request, for example, that various operations be performed, that various information be provided, and/or may otherwise ask data processing systems 102-104 to perform one or more operations that may compromise the provided the computer implemented services.

To manage such risks, the data processing systems of distributed system 100 may implement a security framework. The security framework may require that the data processing systems validate that they are communicating with and/or otherwise interacting with trusted entities.

To enable the data processing systems to perform validations as part of the security framework, the data processing systems may obtain information from certificate authority 120. Certificate authority perform validation processes for trusted entities and distribute security data (e.g., certificates, which may be signed by the certificate authority and verifiable using a publicly available key for the certificate authority) to data processing systems usable to validate trusted entities. When a data processing system interacts with another entity, the data processing system may attempt to validate the entity using the security data. If validated, the data processing system may continue to interact with the entity. Otherwise, the data processing system may discontinue interaction with the entity.

However, this approach to validating entities relies on a single certificate authority. If the certificate authority is unavailable (e.g., to manage security data and update it over time as new information regarding entities becomes available) temporarily or never available, then the security data distributed by certificate authority 120 may not be reliable for validation purposes.

For example, after an entity that was previously validated by certificate authority 120 becomes compromised, if the previously distributed security data is not timely updated (e.g., revoked and/or replaced) by certificate authority 120 then the compromised entity may be believe a trusted entity by the data processing systems of distributed system 100. Further, if certificate authority 120 itself becomes compromised, then all of data processing systems 102-104 may be subject to compromise. For example, the certificate authority may (i) distribute security data that indicates that malicious entities are to be trusted, and/or (ii) may use its authority over data processing systems 102-104 to induce performance of actions that may directly compromise the computer implemented services provided by distributed system 100.

In general, embodiments disclosed herein may provide methods, systems, and/or devices for managing security of distributed systems. The disclosed systems may manage security using security framework that distributes authority throughout the distributed system. By distributing the authority throughout the distributed system, the impact of compromise of portions of the distributed may be limited (e.g., rather than expansive in the case of a compromised certificate authority). Thus, embodiments disclosed herein may address, among others, the technical problem of security in distributed systems. The disclosed embodiments may address security in distributed systems through distributed authority for determining whether entities within the system are trusted.

To provide the above noted functionality, data processing systems 102-104 may implement a security framework that manages authority (e.g., for determining trust) based on a hierarchy. The hierarchy may be established when the distributed system is initially setup. As part of the setup process, a spanning tree or other type of structure for the data processing systems may be established. The spanning tree may be established via any process.

For example, the spanning tree may be established based on connectivity between the data processing systems. Upon startup, the data processing systems may establish a mesh network or other communication topology between the data processing systems. The mesh network may use the spanning tree protocol or other methodology for defining which links between the data processing systems should be active.

The hierarchy of the distributed system may also be established using, at least, a weighted reputation of each data processing system making up the distributed system. The weighted reputation of a data processing system may be affected by (e.g., calculated using) factors such as, but not limited to: seniority, adherence to rules, stability of traffic, etc. Data processing systems with higher (e.g., larger) weighted reputations are deemed more reliable and thus arranged higher within the hierarchy (e.g., may be used as a root data processing system (e.g., a root node) and/or may be located closer to the root node). More reliable data processing systems may also be used to sign (e.g., authenticate/certify) more of the other data processing systems within the distributed system while less reliable data processing systems may be configured to sign less amounts of other data processing systems. Such a hierarchy that prioritizes less risky data processing systems (e.g., data processing systems with higher weighted reputations that are less likely to fail an authentication by another data processing system) advantageously improves the stability of the above-discussed data processing system authentication process.

The hierarchy may be established using both weighted reputation and connectivity of the data processing systems. For example, the weighted reputations may be used to modify an initial hierarchy established through use of the spanning tree protocol. Various exchanges and/or other operations may be performed. The corresponding connectivity of the data processing systems may also be modified, or may not be modified. Refer to FIGS. 2A-2C and 5 for additional details regarding setup of distributed systems and establishing hierarchy.

Once established, the hierarchy may be used to obtain security data for the data processing systems. To obtain the security data, each data processing system may generate a key pair. Data processing systems more highly rated than other data processing systems may establish certificates for lower ranked data processing systems. Refer to FIG. 2D for additional details regarding security data.

The certificates and key pairs may be used in the security framework to validate entities. For example, when a data processing system obtains a communication from an entity, the communication may be validated by ascertaining (e.g., using the certificates) whether a data processing system higher in the hierarchy has validated that the entities is to be trusted. The determination may be made by attempting to use public keys in certificates signed by the data processing system higher in the hierarchy to validate a signature included in the communication. If the signature is validated, then the entity may be identified as being trusted. Otherwise, the entity may be treated as not being trusted. Refer to FIGS. 2E-2F for additional details regarding validating entities.

Over time, some of the data processing systems may be compromised. For example, malicious code may be executed by a data processing system which may modify operation of the data processing system in an undesired manner.

Compromised data processing systems may be identified via any method (e.g., code checksums, challenge-response, etc.). As data processing systems become compromised, some of the security data used in the framework may be updated and/or the hierarchy may be updated (e.g., to exclude the compromised devices). To identify the security data to refresh, the hierarchy may be used to identify data processing systems likely to be impacted by the compromised data processing system. The security data for only those data processing systems may be updated.

If any data processing system cannot be remediated to return to a nominal operating state, then the hierarchy may be updated to exclude the data processing system from the hierarchy. Consequently, the authority vested in these data processing systems may be divested.

Figure 3:
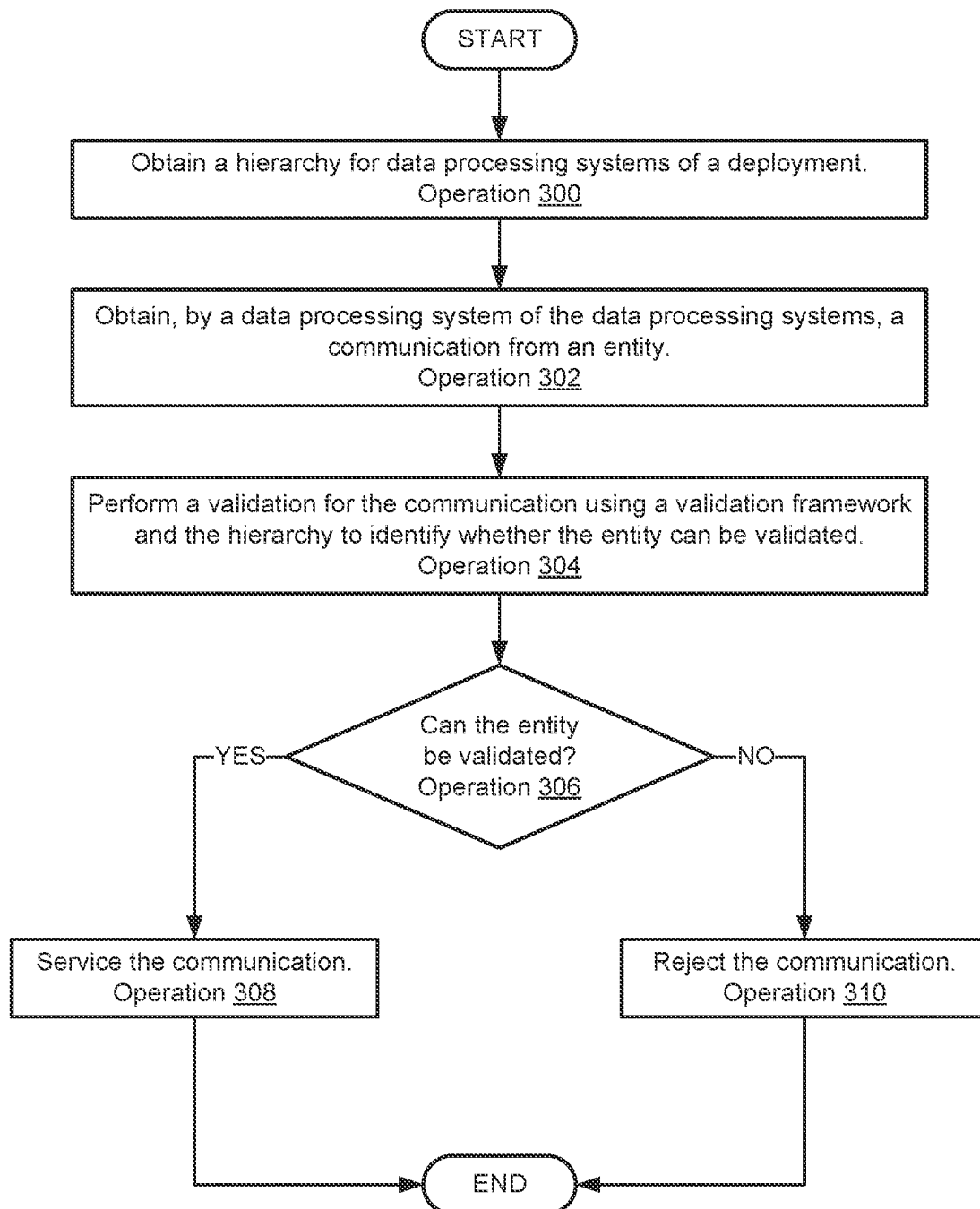
FIGS. 3-4 show flow diagram illustrating methods in accordance with an embodiment.
Figure 4:
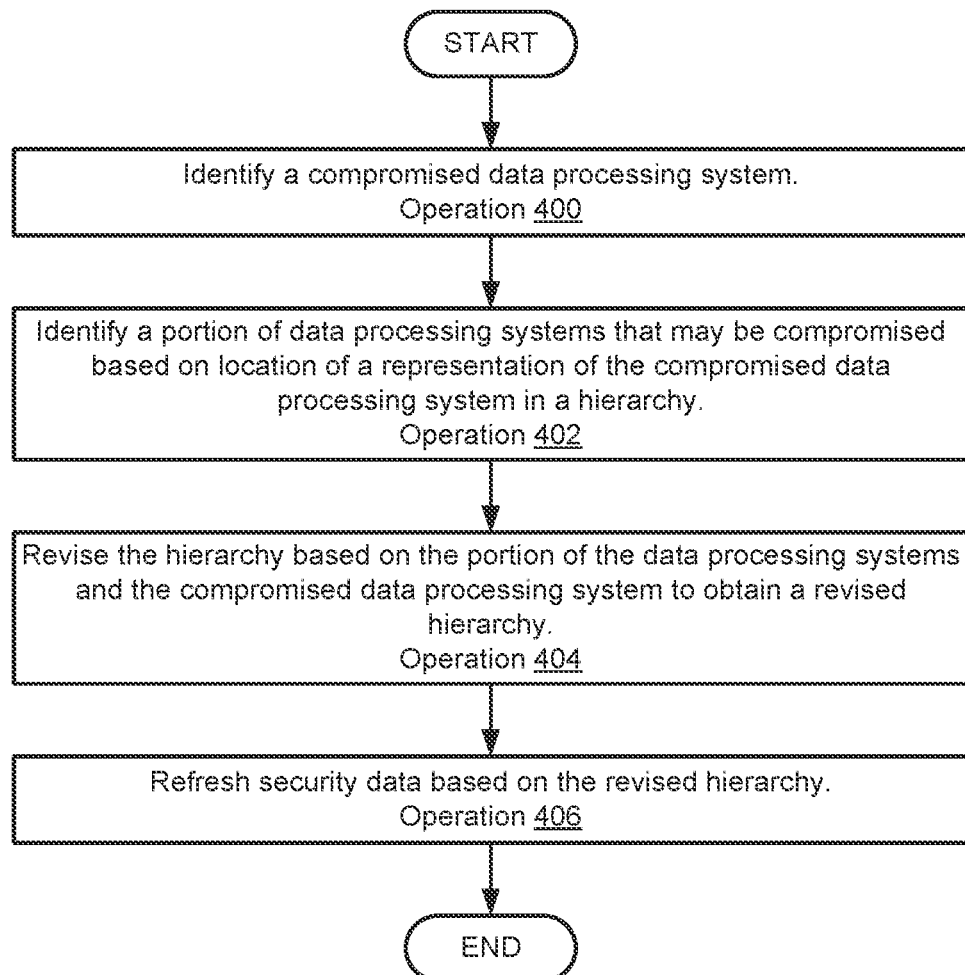
Figure 6:
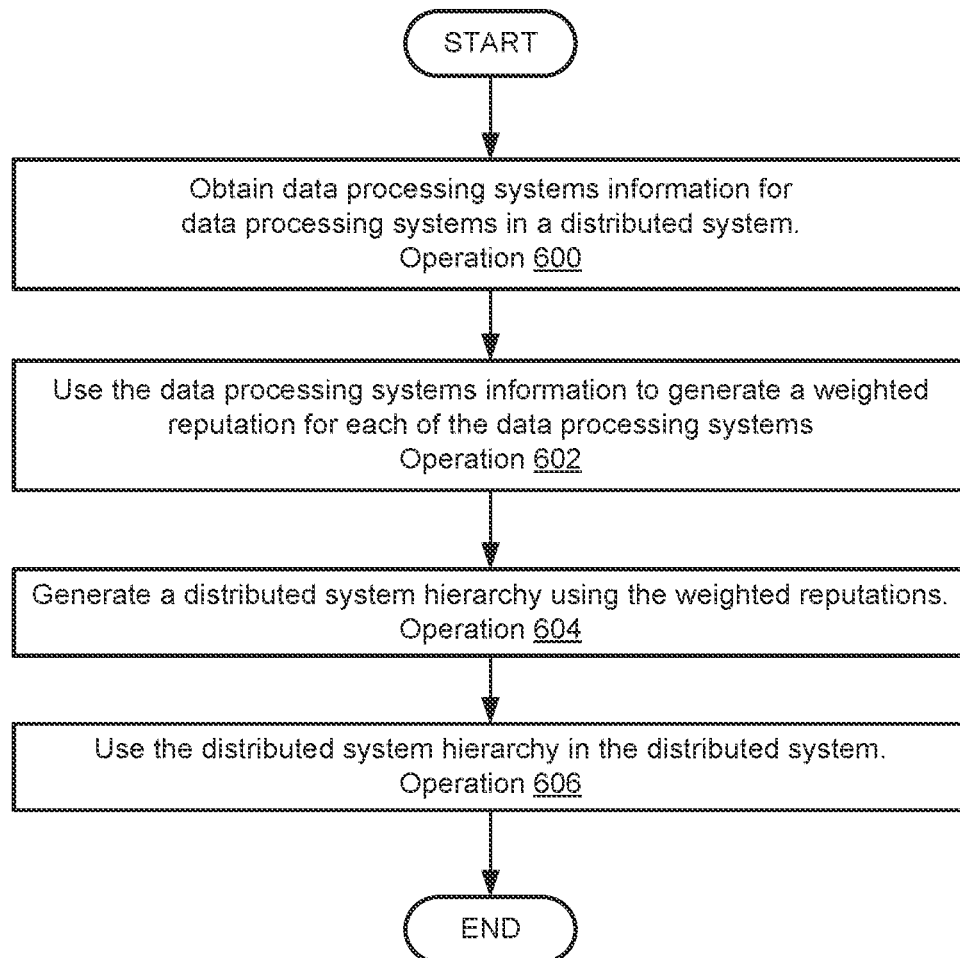
FIG. 6 shows a flow diagram illustrating a method in accordance with an embodiment.

When providing their functionality, any of data processing systems 102-104 may perform all, or a portion, of the methods illustrated in FIGS. 3-4 and 6.

Any of data processing systems 102-104 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 7.

Any of the components illustrated in FIG. 1 may be operably connected to each other (and/or components not illustrated) with communication system 130. In an embodiment, communication system 130 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein. For example, a system may include any number of instances of distributed system 100 and/or other components not shown in FIG. 1. Any of the instances may perform similar and/or different functions performed by other instances.

Figure 2A:
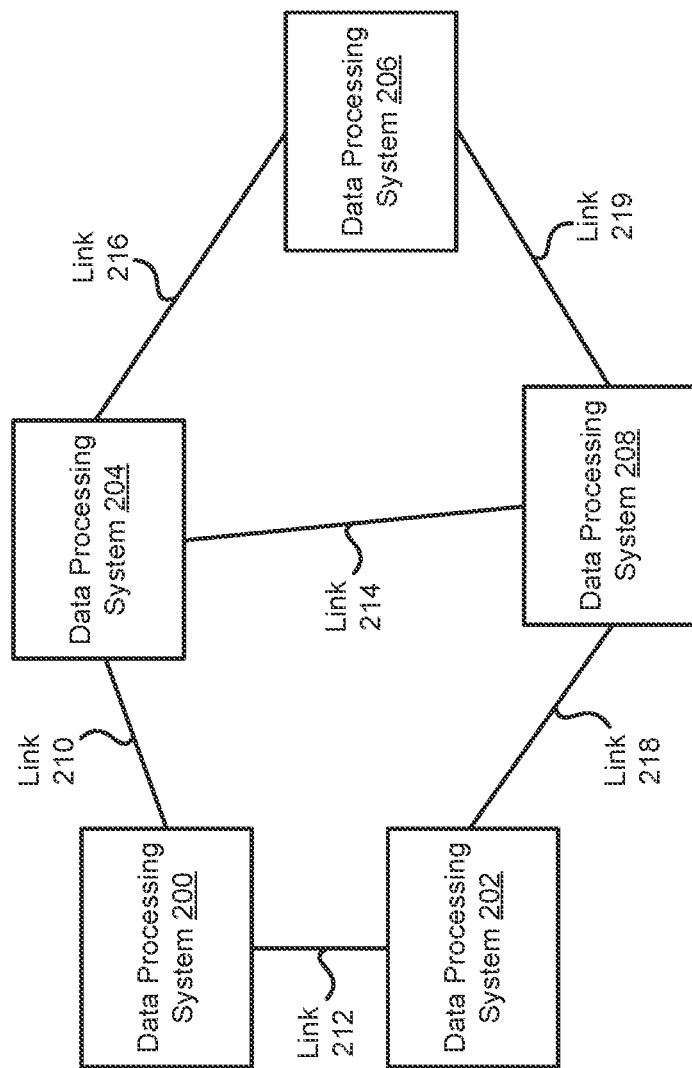
FIG. 2A shows a first diagram of a distributed system in accordance with an embodiment.

Turning to FIG. 2A, a first diagram of an example topology of a distributed system in accordance with an embodiment is shown. The distributed system may provide any type and quantity of computer implemented services.

To provide the services, the distributed system may include data processing systems 200-208. The data processing systems may be implemented using, for example, internet of things devices. The data processing systems may include wired and/or wireless communication hardware through which any number of links (e.g., communication channels) may be established. In the example distributed system shown in FIG. 2A, only a limited number of links 210-219 may be established between the data processing systems. Links 210-219 may form the basis for a mesh or other type of network.

In the state shown in FIG. 2A, the data processing systems 200-208 may have been migrated from a first environment (e.g., factory) in which trust between the data processing systems was established to a new environment in which devices of malicious parties may be present. Consequently, the data processing systems may need to establish a security framework mitigate the threats presented by the malicious parties.

Figure 2B:
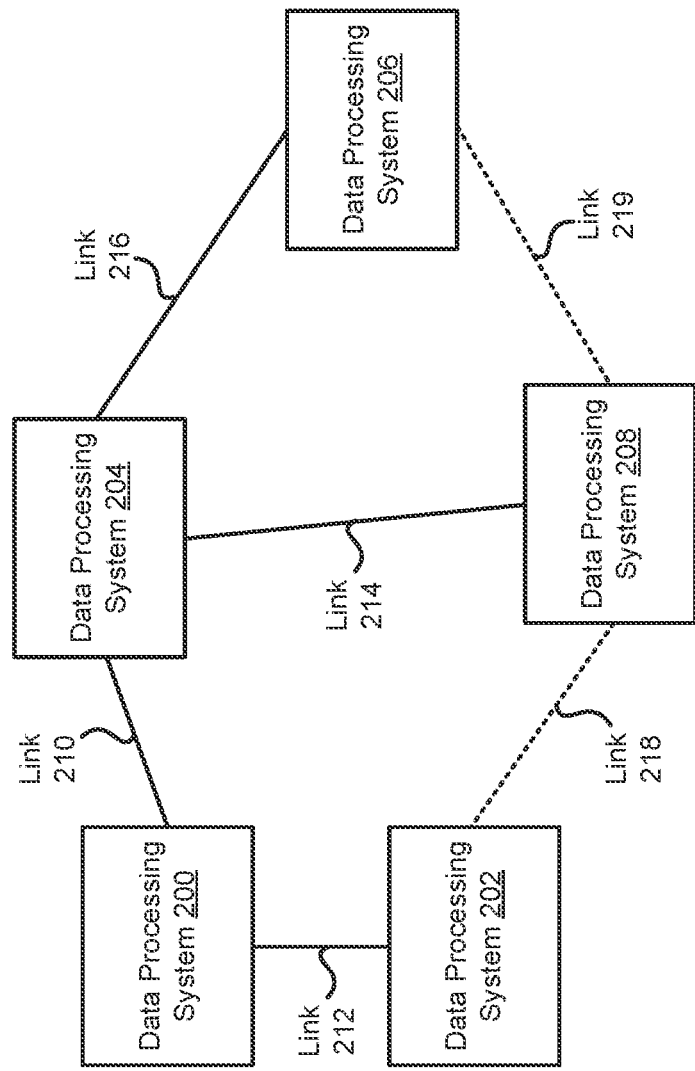
FIG. 2B shows a second diagram of a distributed system in accordance with an embodiment.

Turning to FIG. 2B, a second diagram of an example topology of a distributed system in accordance with an embodiment is shown. Continuing with the previous example discussed with respect to FIG. 2A, once deployed the data processing systems may perform the spanning tree protocol or other network analysis algorithms to establish a loop-free logical topology for communication between the data processing systems. In this example, the result of performing the spanning tree protocol may indicate that link 218 and link 219 are to be disabled (drawn in dashing to indicate being disabled). In this example, data processing system 204 may be a gateway to other networks or devices. Thus, data processing system 204 may serve as the root with the links being pruned to accomplish various goals (e.g., minimize link contention).

As discussed above, a hierarchy for the data processing systems may be established based at least in part on a spanning tree for the data processing systems. The result of the spanning tree protocol for network configuration may be a spanning tree usable for other purposes. In this example, the same spanning tree generated for network configuration may be used to establish the hierarchy, or at least an initial iteration of the hierarchy.

Figure 2C:
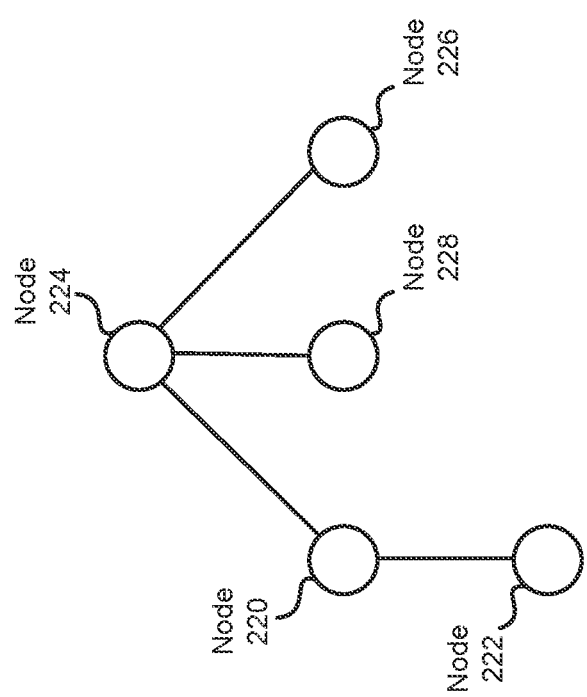
FIG. 2C shows a second diagram of a spanning tree in accordance with an embodiment.
Figure 2D:
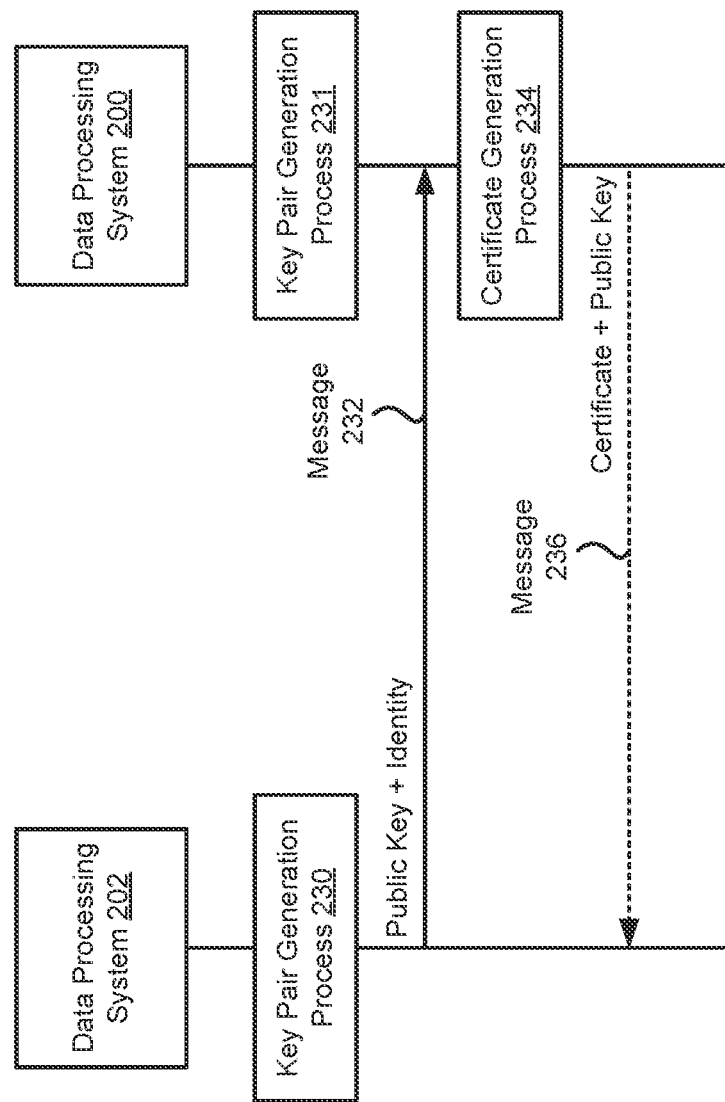
FIG. 2D shows a first data flow diagram illustrating data flows in accordance with an embodiment.
Figure 2E:
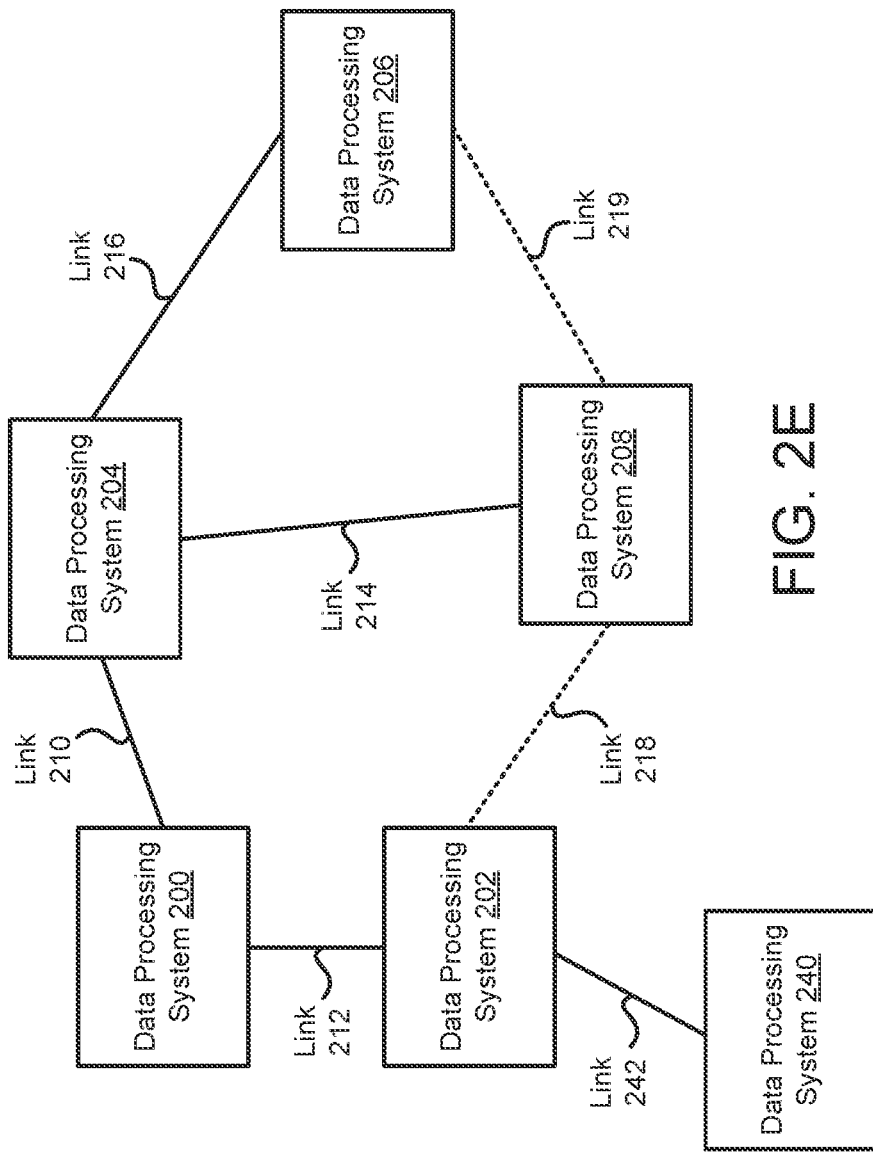
FIG. 2E shows a third diagram of a distributed system in accordance with an embodiment.
Figure 2F:
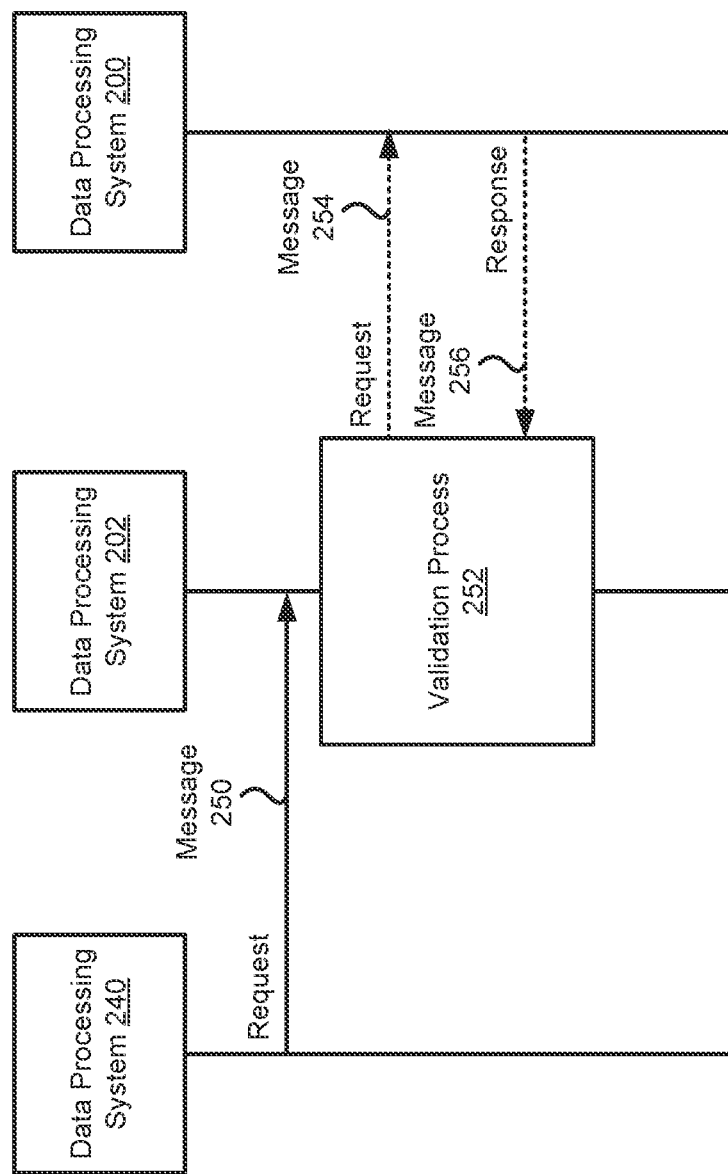
FIG. 2F shows a second data flow diagram illustrating data flows in accordance with an embodiment.

Turning to FIG. 2C, a diagram of a spanning tree in accordance with an embodiment is shown. As discussed above, the spanning tree may be established using the spanning tree protocol. However, it will be appreciated that other algorithms may be used to obtain a spanning tree (or other type of structure) for the distributed system.

The spanning tree may include nodes 220-228. The nodes may correspond to different data processing systems. Node 224 (e.g., a root node) may correspond to data processing 204. Node 220 may correspond to data processing system 200. Node 222 may correspond to data processing system 202. Node 226 may correspond to data processing system 206. Node 228 may correspond to data processing system 208.

While used to configure the links, the spanning tree may also be used to establish authority for validating entities in the system. Rather than having a central authority for validating entities, each data processing system may have authority for validating entities below them (i.e., the data processing system corresponding to child nodes) in the hierarchy.

For example, node 220 may be responsible for validating for node 222. In other words, node 222 may treat node 220 as the entity that must attest to the validity of any entity.

To facilitate validation, each of the nodes may generate security data usable for validation purposes. Refer to FIG. 2D for additional details regarding generation of security data.

While the spanning tree illustrated in FIG. 2C may be used as a hierarchy, it will be appreciated that the hierarchy may be modified based on weighted reputations of the data processing systems corresponding to the nodes, and/or may be based entirely on weighted reputations of the data processing systems. If based on a combination of each, an initial spanning tree may be establishing using the spanning tree protocol. The weighted reputations for the data processing systems may then be established and used to, for example, modify locations of some nodes in the spanning tree, divide branches, consolidate branches, and/or perform other types of modifications. The modifications may be performed to move nodes corresponding data processing systems with larger weighted reputations towards the root and other nodes corresponding to other data processing systems with smaller weighted reputations towards the leaves (e.g., 222, 228, 226).

Turning to FIG. 2D, a first data flow diagram in accordance with an embodiment is shown. In the diagram, processes performed by entities are diagrammed as boxes positioned over the line descending from the box representing each entity. For example, the box marked as 230 in FIG. 2D may be a process performed by data processing system 202 through which data is obtained. Additionally, in the diagram, data flows between devices are shown with lines terminating in arrows between the lines descending from each of the boxes representing the entities. For example, the line terminating in an arrow and marked as 232 may indicate a data flow from data processing system 202 to data processing system 200. Further, the activities indicated by the elements below the boxes representing each entity may be temporally ordered such that activities shown higher on the page may be performed activities shown lower on the page. Other data flows diagrams discussed below may follow similar conventions.

Continuing with the discussion from FIG. 2D, security data may be generated usable to perform validations. A portion of the security data may be generated by each of the data processing systems through key pair generation processes (e.g., 230, 231). The data processing systems may include hardware capable of generating secure key pairs including private and public keys.

Once generated, each data processing system may identify their respective place in the hierarchy. Once identified, the data processing system above them (if any) in the hierarchy may be identified. In this example, data processing system 200 is above data processing system 202 in the hierarchy.

Once identified, data processing system 202 may send message 232 to data processing system 200. The message may request that data processing system 200 sign for data processing system (e.g., create an attestation usable to validate data processing system 202). Message 232 may include the public key of the key pair and an identity of data processing system 202. Data processing system 200 perform certificate generation process 234 to sign as requested. During certification generation process 234, data processing system 200 may sign the public key and identity (e.g., may be an identifier for data processing system 202) using a private key generated by data processing system 200 during key pair generation process 231 thereby generating additional security data (e.g., a certificate). The additional security data may allow any entity that views data processing system 202 as authoritative (e.g., based on the hierarchy) to validate whether a communication is from data processing system 202.

For example, data processing system 202 may sign communications using a private key of the key pair generated in key pair generation process 230. An entity that receives the communication may use the public key from the certificate to identify that the entity that generated the communication has access to the private key of the key pair. And the entity may use the public key of data processing system 200 to determine that the certificate should be trusted.

The certificate and public key of data processing system 200 may be published by sending them to data processing system 202 and/or other entities (e.g., via message 236). Once distributed, the data processing systems of the distributed system may have sufficient security data to quickly ascertain whether a communication is from a trusted source and/or whether and entity that sent the communication should be trusted. Any quantity of security data for any number of data processing systems of a distributed system may be established in this manner.

Turning to FIG. 2E, a third diagram of an example topology of a distributed system in accordance with an embodiment is shown. Continuing with the example discussed with respect to FIG. 2D, now consider an example scenario where data processing system 240 establishes link 242 with data processing system 202 and attempt to communicate with data processing system 202. Prior to acting on the communications, data processing system 202 may initiate performance of a validation for data processing system 240.

Turning to FIG. 2F, a second data flow diagram in accordance with an embodiment is shown. Continuing with the example from FIG. 2E, data processing system 240 may initiate communication with data processing system 202 by sending message 250 in which a request is made to data processing system 202. The request may indicate that a particular action is to be performed.

Prior to acting on the request, data processing system 202 may perform validation process 252. During validation process 252, data processing system 202 may evaluate the security data (e.g., signatures) included in message 250.

If no signature is included, then message 250 may be treated as being from an untrusted entity.

If a signature is included, then security data may be used to ascertain whether the entity that generated message 250 should be trusted. To do so, data processing system 202 may initiate a verification for the signature. During the verification, data processing system 202 may use security data generated by data processing system 200 to attempt to verify the signature. For example, public keys and/or identifiers from certificates signed by data processing system 200 may be used to attempt to (i) validate the signatures and (ii) verify that the signatures are associated with the identifiers. If the signatures are both valid and associated with the entity alleged in message 250 to have generated message 250, then the entity and/or message 250 may be treated as a trusted entity (e.g., the message 250 may be processed rather than discarded). If the signatures cannot be validated or are not associated with the entity alleged in message 250 to have generated message 250, then the entity and/or message 250 may be treated as not trustworthy.

To verify the signatures, data processing system 202 may use local copies of certificates, or data processing system 202 may forward the request via message 254 for data processing system 200 for analysis. If forwarded to data processing system 200, then a response may be returned to data processing system 202 via message 256.

Once the trustworthiness of the message and/or sender identified, then data processing system 202 may take appropriate action.

As discussed above, the components of FIG. 1 may perform various methods to manage security of distributed systems. FIGS. 3-4 illustrate methods that may be performed by the components of the system of FIG. 1. In the diagrams discussed below and shown in FIGS. 3-4, any of the operations may be repeated, performed in different orders, and/or performed in parallel with or in a partially overlapping in time manner with other operations.

Turning to FIG. 3, a flow diagram illustrating a method for performing validations in accordance with an embodiment is shown. The method may be performed by any of data processing systems 102-104 and/or other components of the system shown in FIG. 1.

At operation 300, a hierarchy for data processing systems of a distributed system is obtained. The hierarchy may be obtained by performing an analysis of the data processing systems to obtain a spanning tree. The hierarchy may be defined by the spanning tree.

The analysis performed to obtain the spanning tree may be the spanning tree protocol, or other algorithm. The data processing systems may cooperatively perform the algorithm used to obtain the spanning tree.

The hierarchy may be used to obtain security data, as described with respect to FIGS. 2D-2F.

At operation 302, a communication from an entity is obtained by one of the data processing systems. The communication may be obtained by receiving it from another device.

At operation 304, a validation for the communication is performed using a validation framework and the hierarchy to identify whether the entity can be validated. The validation may be performed by (i) using the hierarchy to identify an authoritative data processing system (e.g., higher in the hierarchy and has authority to identify valid entities) with respect to the data processing system, and (ii) using security data associated with the authoritative data processing system to determine whether the entity can be validated.

For example, signatures in the communication may attempt to be validated, as discussed with respect to FIG. 2F. If the signatures can be validated and are associated with the entity that sent the communication, then it may be determined that the entity can be validated. If the communication is not signed, the signature cannot be validated, or the signature is not associated with the entity that send the communication, then the entity may be determined to not be valid.

If the entity can be validated, then the method may proceed to operation 308. If the entity cannot be validated, then the method may proceed to operation 310.

At operation 308, the communication is serviced. The communication may be serviced by, for example, processing a request included in the message. Processing the request may cause the data processing system to perform any number and type of actions. The method may end following operation 308.

Returning to operation 306, the method may proceed to operation 310 if the entity cannot be validated.

At operation 310, the communication is rejected. The communication may be rejected by, for example, discarding the communication without processing the content. The communication may also be rejected by, for example, sending alerts or notification to other data processing systems indicating presence of a malicious entity, attempting to validate the entity again, etc.

The method may end following operation 310.

Using the method shown in FIG. 3, distributed systems may be secured. However, if data processing systems of a distributed system becomes compromised, then the data processing system and other data processing systems for which the data processing services an authoritative data processing system may be subject to compromise. For example, the compromised data processing system may validate communication that are, in face, malicious in nature.

Turning to FIG. 4, a flow diagram illustrating a method for responding to compromised data processing systems in accordance with an embodiment is shown. The method may be performed by any of data processing systems 102-104 and/or other components of the system shown in FIG. 1.

At operation 400, a compromised data processing system may be identified. The compromised data processing system may be identified by (i) analyzing operation of the compromised data processing system, (ii) obtaining an indication from another device that the compromised data processing system is compromised, and/or via other methods.

At operation 402, a portion of data processing systems that may be compromised are identified based on a location of a representation of the compromised data processing system in the hierarchy. The portion may the data processing systems associated with the nodes of the spanning tree that are children of the node of the spanning tree associated with the compromised data processing system. In other words, the data processing systems that may view the compromised data processing system as authoritative.

At operation 404, the hierarchy is revised based on the portion of the data processing systems and the compromised data processing system to obtain a revised hierarchy. The hierarchy may be revised by (i) performing a remediation process for each data processing system of the portion of the data processing systems and the compromised data processing system to identify any remediated data processing systems and confirmed compromised data processing systems, and (ii) establishing a new hierarchy based on the data processing systems of the distributed system but excluding the confirmed compromised data processing systems. The new hierarchy may be the revised hierarchy.

The remediation process may include, for example, (i) performing processes to attempt to remove malware or other entities from the portion of the data processing systems and the compromised data processing system, and (ii) performing security scans or other types of confirmatory operation identify remediated data processing systems (e.g., that pass the security scans) and confirmed compromised data processing systems (e.g., that fail the security scans).

At operation 406, the security data is refreshed based on the revised hierarchy. The security data may be refreshed similar to how the security data was generated (e.g., generation of new key pairs, certificates, etc.).

The method may end following operation 406.

By remediating compromised data processing systems using the method shown in FIG. 4, embodiments disclosed herein may resecure distributed systems following compromises more efficiently. For example, by only needing to resecure a portion of the data processing systems and generating some security data (e.g., only for the impacted data processing systems), the overhead for resecuring the distributed system may be reduced. Thus, a system in accordance with embodiments disclosed herein may more efficiently marshal limited computing resources by avoiding needless expenditures of computing resources for security.

However, the extent of the portion of data processing systems that may need to be resecured may depend on the location in which the node resides in the hierarchy (e.g., nodes closer to the root that become compromised may result in larger portions). To reduce the likelihood of higher impact data processing systems due to their location within the hierarchy being compromised, the hierarchy may be established, at least in part, based on the likelihood of each of the data processing systems being compromised.

Figure 5:
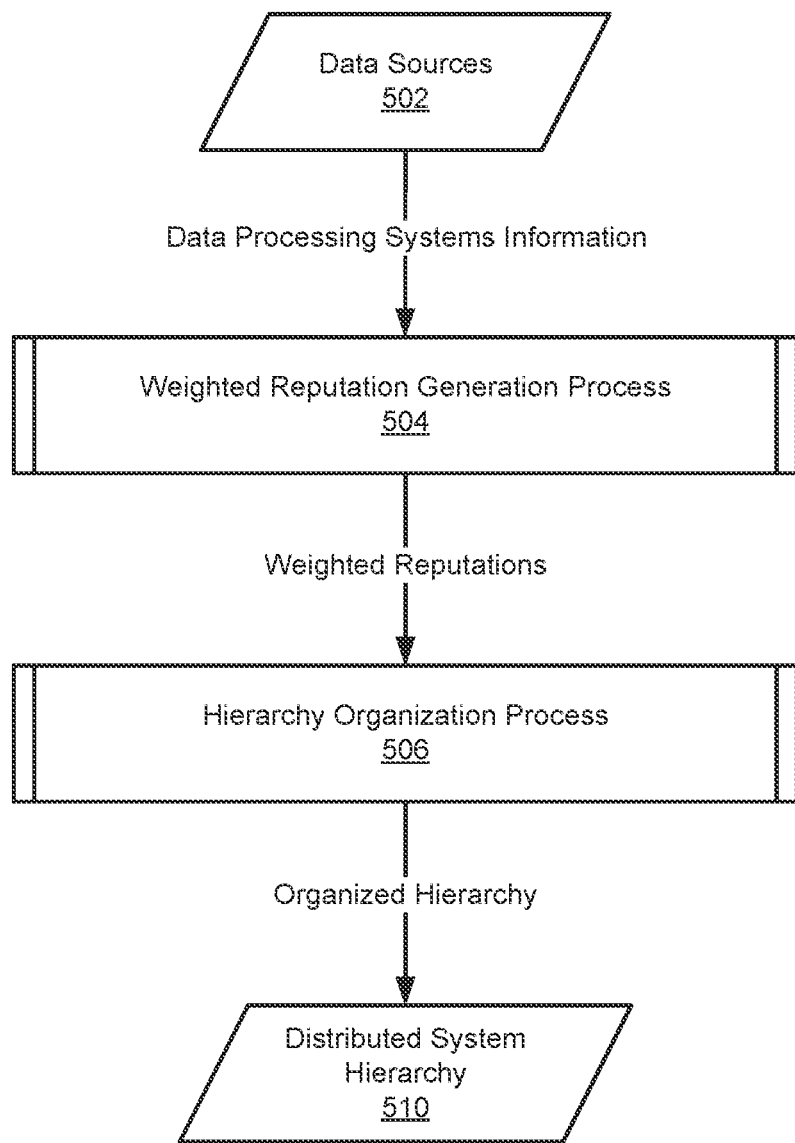
FIG. 5 shows a third data flow diagram in accordance with an embodiment.

Turning to FIG. 5, a data flow diagram in accordance with an embodiment is shown. The data flow diagram illustrates a process of obtaining a hierarchy for the distributed system (e.g., a hierarchy of the data processing systems making up the distributed system). The flow in FIG. 5 may be used to establish a hierarchy that places data processing systems that are less likely to be compromised closer to the root of the hierarchy. As discussed above, the hierarchy may be based on a spanning tree for the data processing systems. The hierarchy may also be based on (e.g., in addition to being based on the spanning tree) a reliability of each data processing system in the distributed system, as discussed in more detail below.

As shown in FIG. 5, data processing systems information of the data processing systems may be gathered (e.g., retrieved from) from data sources 502. Data sources 502 may include: any of the data processing systems of the distributed system; a provider (e.g., manufacturer, vendor, distributer, etc.) of the data processing systems; any number of computing devices and/or storage devices external to the distributed system; and/or any source from which data processing systems information may be stored and/or retrieved.

The data processing systems information from the data sources 502 may include, but is not limited to, statistics and parameters (e.g., characteristics) for each of the data processing system including: operational data (e.g., from the system/data logs of each data processing system); specification data including default factory specifications; and/or any relevant data that could be used to characterize (e.g., describe) a state of each of the data processing systems. Operational data of each of the data processing systems may include, but is not limited to: a total time of operation (e.g., run time) within the distributed system; an installation date of the data processing system within the distributed system; a total downtime of the data processing system; the number of errors/crashes experienced by the data processing system; adherence of the data processing systems to one or more rules (e.g., communication rules, connection rules, data transfer rules, etc.) set for the distributed system (also referred to herein as an "operating rule adherence rate"); traffic rate and/or traffic amount flowing through the data processing system; traffic latency; and/or any other relevant data that can be used to describe an operating state of the data processing system.

Weighted reputation generation process 504 may obtain (e.g., receive, retrieve, collect, etc.) the data processing systems information from the data sources 502 to generate (e.g., calculate) a weighted reputation score (also referred to herein simply as a "weighted reputation") for each of the data processing systems in the distributed system. The weighted reputation score may be calculated using any formulas, algorithms, and/or models that are able to covert the data processing systems information into a weighted score (e.g., weighted value). The weighted reputation score may indicate a reliability of each data processing system within the distributed system where a higher weighted reputation score represents higher reliability while a lower weighted reputation score represents lower reliability. For example, a first data processing system that is more senior (e.g., been operating longer), adheres better to rules, has zero down time within the distributed system, and has stable traffic will have a higher weighted reputation score (e.g., be more reliable) than a second data processing system that is younger (e.g., recently installed) and has more downtime (e.g., experienced more errors and crashes) within the distributed system. Similarly, a data processing system that hosts an agent that screens for malicious activity may be less likely to be compromised by a malicious entity than another data processing system that does not screen for malicious activity.

Hierarchy organization process 506 may obtain the weighted reputations (e.g., the weighted reputation scores generated by weighted reputation generation process 504) and generate a hierarchy for the distributed system (e.g., distributed system hierarchy 510 generated by the organized hierarchy produced by the hierarchy organization process 506). Data processing systems with higher weighted reputations may be: (i) placed higher on the hierarchy than data processing systems with lower weighted reputations; and/or (2) configured to be given responsibility to sign (e.g., authenticate/certify) more of the other data processing systems (e.g., data processing systems with a lower weighted reputation than the weighted reputation of the signing data processing system) within the distributed system. A data processing system with the highest weighted reputation may be selected as a root node for the distributed system. Alternatively, the root node may be selected irrespective of (e.g., without taking into consideration of/independent of) the weighed reputations while the hierarchy of the remaining data processing systems to be connected to the root node may be selected based on (e.g., dependent of) the weighted reputations.

In some embodiments, the hierarchy for the distributed system may first be established based on the spanning tree before the weighted reputations are taken into consideration by the hierarchy organization process, or vice versa. In some embodiments, the weighted reputations may be continuously updated throughout the operation lifetime of the distributed system. Each time the weighted reputations are updated, the hierarchy may also be updated (e.g., by hierarchy organization process 506) to reflect (e.g., take into account/consider) the updated weighed reputations.

For example, referring back to FIG. 2C showing a diagram of an example spanning tree. Here, node 224 (e.g., the root node) would have a highest weighted reputation score among all of the existing nodes (e.g., nodes 220, 222, 224, 226, and 228) shown in this spanning tree. As a result, node 224 is more trusted and given the responsibility of signing (e.g., authenticating/certifying) more nodes than the other nodes. Furthermore, each of nodes 220, 228, and 226 that are directly connected to the root node 224 would have a higher weighted reputation than node 222 (and a lower weighted reputation than node 224). Lastly, node 220 which signed node 222 would have a higher weighted reputation than nodes 228 and 226, both of which have no further connected neighboring nodes. In this same example, the root node 224 need not have the highest weighted reputation.

As yet another example and still referring to the spanning tree of FIG. 2C, assume, for example, that node 222 has a higher weighted reputation than node 220. As a result, instead of node 220 being connected to node 224 (e.g., the root node) and authenticating/certifying node 222, node 222 would now be directly connected to node 224 while node 220 would be connected to (and authenticated/certified by) node 222.

Turning now to FIG. 6, FIG. 6 shows a flow diagram illustrating a method of managing operation of a data processing system in accordance with an embodiment. The method may be performed by the system of FIG. 1. Any of the operations described with respect to FIG. 4 may be performed in different orders, skipped, repeated, and/or be performed in a parallel or partially overlapping in time manner.

At operation 600, data processing systems information may be obtained for each of the data processing systems configured within a distributed system. The data processing systems information may be obtained from one or more data sources (e.g., data source 500 as described above in connection with FIG. 5). The data processing systems information may be obtained by: being received via a transmission from any of the data sources, directly retrieved from the data sources, etc.

At operation 602, as discussed above in reference to FIG. 5, the data processing system information may be used to generate (e.g., using weighted reputation generation process 504) a weighted reputation score for each of the data processing systems in the distributed systems.

At operation 604, as discussed above in reference to FIG. 5, the weighted reputations (e.g., ones generated in operation 602) may be used to generate (e.g., using hierarchy organization process 506 of FIG. 5) a hierarchy (also referred to as a "distributed system hierarchy") for the data processing systems of the distributed system. In some embodiments, the hierarchy for the distributed system may first be established based on the spanning tree before the weighted reputations are taken into consideration by the hierarchy organization process, or vice versa. In some embodiments, the weighted reputations may be continuously updated throughout the operation lifetime of the distributed system. Each time the weighted reputations are updated, the hierarchy may also be updated (e.g., by hierarchy organization process 506) to reflect (e.g., take into account/consider) the updated weighed reputations.

At operation 606, the hierarchy (e.g., the hierarchy generated in operation 604) may be used in the distributed system. In particular, by having data processing systems with higher weighted reputations (e.g., by prioritizing data processing systems that are less risky) located closer to a root node of the distributed system, the stability of the above-discussed authentication hierarchy (e.g., in FIGS. 3 and 4) may be improved as reliable nodes posing less risk and potential impact on a larger number of nodes signed by the reliable nodes are placed closer to the roots (e.g., directly to connected to or within a predetermined connection threshold from the root).

The method may end following operation 606.

Once obtained, the hierarchy may be used to validate authority of various entities, and received requests. The validated authority may be used to provide computer implemented services. For example, requests by entities that lack validated authority may be rejected and requests for performance of various actions from entities that have validated authority may be implemented. Consequently, the resulting computer implemented services that are provided may include performance of certain requested actions and not performed based on other requested actions.

Figure 7:
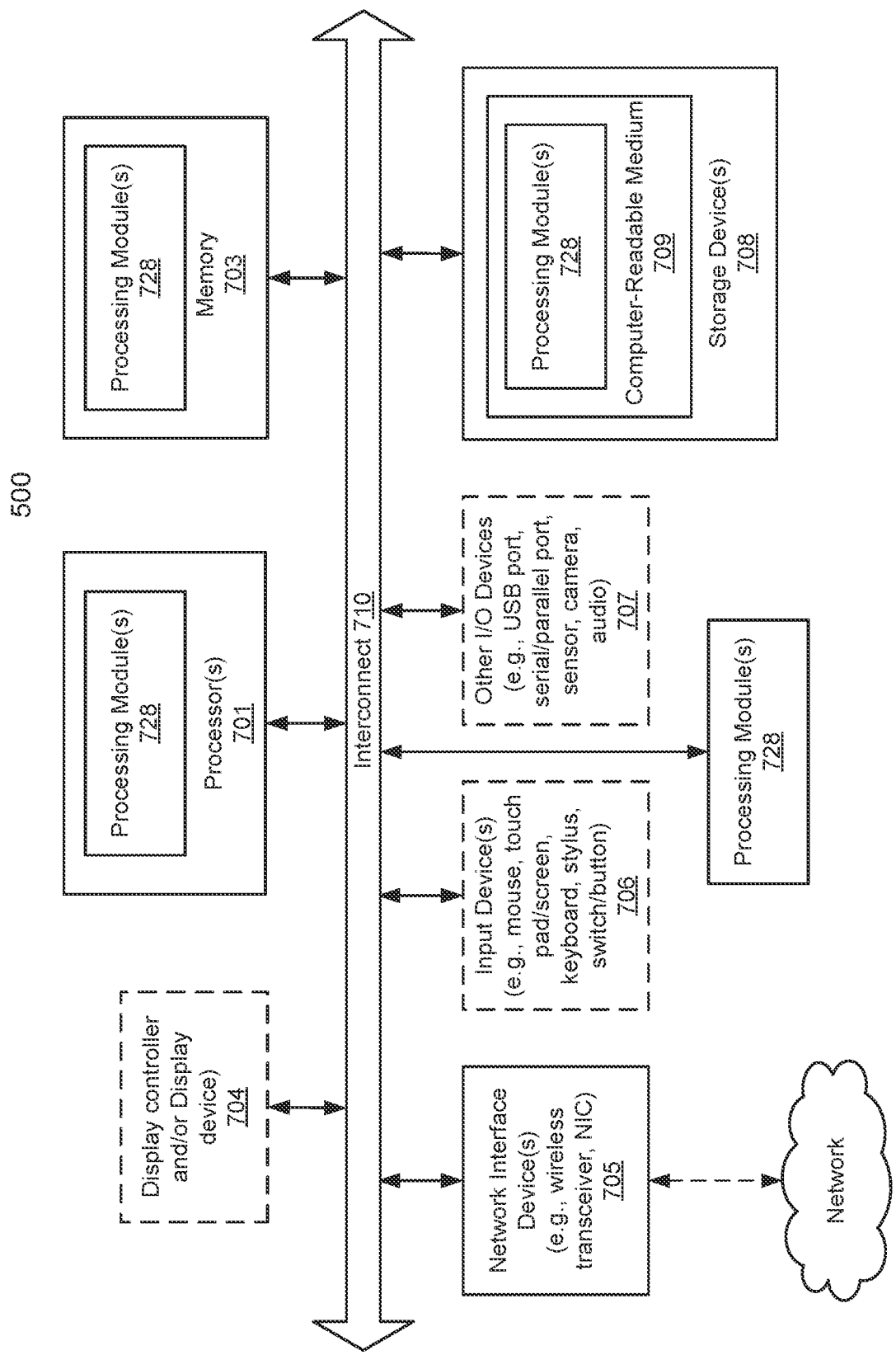
FIG. 7 shows a block diagram illustrating a data processing system in accordance with an embodiment.

Any of the components illustrated in FIGS. 1-2F and 5 may be implemented with one or more computing devices. Turning to FIG. 7, a block diagram illustrating an example of a data processing system (e.g., a computing device) in accordance with an embodiment is shown. For example, system 700 may represent any of data processing systems described above performing any of the processes or methods described above. System 700 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 700 is intended to show a high level view of many components of the computer system. However, it is to be understood that additional components may be present in certain implementations and furthermore, different arrangement of the components shown may occur in other implementations. System 700 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 700 includes processor 701, memory 703, and devices 705-707 via a bus or an interconnect 710. Processor 701 may represent a single processor or multiple processors with a single processor core or multiple processor cores included therein. Processor 701 may represent one or more general-purpose processors such as a microprocessor, a central processing unit (CPU), or the like. More particularly, processor 701 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 701 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 701, which may be a low power multi-core processor socket such as an ultra-low voltage processor, may act as a main processing unit and central hub for communication with the various components of the system. Such processor can be implemented as a system on chip (SoC). Processor 701 is configured to execute instructions for performing the operations discussed herein. System 700 may further include a graphics interface that communicates with optional graphics subsystem 704, which may include a display controller, a graphics processor, and/or a display device.

Processor 701 may communicate with memory 703, which in one embodiment can be implemented via multiple memory devices to provide for a given amount of system memory. Memory 703 may include one or more volatile storage (or memory) devices such as random access memory (RAM), dynamic RAM (DRAM), synchronous DRAM (SDRAM), static RAM (SRAM), or other types of storage devices. Memory 703 may store information including sequences of instructions that are executed by processor 701, or any other device. For example, executable code and/or data of a variety of operating systems, device drivers, firmware (e.g., input output basic system or BIOS), and/or applications can be loaded in memory 703 and executed by processor 701. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 700 may further include IO devices such as devices (e.g., 705, 706, 707, 708) including network interface device(s) 705, optional input device(s) 706, and other optional IO device(s) 707. Network interface device(s) 705 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 706 may include a mouse, a touch pad, a touch sensitive screen (which may be integrated with a display device of optional graphics subsystem 704), a pointer device such as a stylus, and/or a keyboard (e.g., physical keyboard or a virtual keyboard displayed as part of a touch sensitive screen). For example, input device(s) 706 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 707 may include an audio device. An audio device may include a speaker and/or a microphone to facilitate voice-enabled functions, such as voice recognition, voice replication, digital recording, and/or telephony functions. Other IO devices 707 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 707 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 710 via a sensor hub (not shown), while other devices such as a keyboard or thermal sensor may be controlled by an embedded controller (not shown), dependent upon the specific configuration or design of system 700.

To provide for persistent storage of information such as data, applications, one or more operating systems and so forth, a mass storage (not shown) may also couple to processor 701. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 701, e.g., via a serial peripheral interface (SPI). This flash device may provide for non-volatile storage of system software, including a basic input/output software (BIOS) as well as other firmware of the system.

Storage device 708 may include computer-readable storage medium 709 (also known as a machine-readable storage medium or a computer-readable medium) on which is stored one or more sets of instructions or software (e.g., processing module, unit, and/or processing module/unit/logic 728) embodying any one or more of the methodologies or functions described herein. Processing module/unit/logic 728 may represent any of the components described above. Processing module/unit/logic 728 may also reside, completely or at least partially, within memory 703 and/or within processor 701 during execution thereof by system 700, memory 703 and processor 701 also constituting machine-accessible storage media. Processing module/unit/logic 728 may further be transmitted or received over a network via network interface device(s) 705.

Computer-readable storage medium 709 may also be used to store some software functionalities described above persistently. While computer-readable storage medium 709 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 728, components and other features described herein can be implemented as discrete hardware components or integrated in the functionality of hardware components such as ASICS, FPGAs, DSPs or similar devices. In addition, processing module/unit/logic 728 can be implemented as firmware or functional circuitry within hardware devices. Further, processing module/unit/logic 728 can be implemented in any combination hardware devices and software components.

Note that while system 700 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing security of a distributed system, the method comprising:
   obtaining data processing systems information for data processing systems of the distributed system;
   using the data processing systems information to generate a weighted reputation for each of the data processing systems;
   generating a hierarchy for the distributed system based on the weighted reputations;
   validating, using the hierarchy, which of the data processing systems in the distributed system have authority over other ones of the data processing systems within the distributed system; and
   providing computer implemented services based on a result of the validating.

2. The method of claim 1, wherein the data processing systems information comprises operational data and specification data of each of the data processing systems.

3. The method of claim 2, wherein the operational data comprises a total run time and an operating rule adherence rate of each of the data processing systems.

4. The method of claim 2, wherein the operational data comprises-a traffic rate and an operating rule adherence rate of each of the data processing systems.

5. The method of claim 2, wherein the operational data comprises an operating rule adherence rate of each of the data processing systems.

6. The method of claim 1, wherein a first data processing system of the data processing systems having a higher one of the weighted reputation than a second data processing system among of the data processing systems is higher within the hierarchy than the second data processing system.

7. The method of claim 1, further comprising:
   after generating the hierarchy in the distributed system:
      identifying a compromised data processing system of the data processing systems of the distributed system; and
      identifying a portion of the data processing systems that may be also compromised based on a representation of the data processing systems in the hierarchy.

8. The method of claim 7, wherein verifying the communications comprises:
   for a communication of the communications sent by a sending entity:
      identifying, by a receiving data processing system of the data processing systems that received the communication, an authoritative data processing system of the data processing systems using the revised hierarchy;
      making a determination regarding whether the entity is trusted using a portion of the refreshed security data associated with the authoritative data processing system;
      in a first instance of the determination where the entity is trusted:
         servicing the communication; and
      in a second instance of the determination where the entity is not trusted:
         rejecting the communication.

9. The method of claim 7, further comprising and after generating the hierarchy:
   revising the hierarchy based on the portion of the data processing systems and the compromised data processing system to obtain a revised hierarchy;
   refreshing security data for the data processing systems using the revised hierarchy; and
   verifying communications obtained by the data processing systems using the refreshed security data.

10. The method of claim 1, wherein the hierarchy is further based on a spanning tree for the data processing systems.

11. The method of claim 10, wherein the data processing systems implement a security framework based on the hierarchy, the security framework vesting security authority in each data processing system of the data processing systems over a portion of the data processing systems that are all lower in the hierarchy, and the portion of the data processing systems are associated with child nodes of a node of the spanning tree associated with the data processing system that is vested with the security authority.

12. The method of claim 5, wherein the spanning tree is based on communication links established by the data processing systems through formation of a mesh network.

13. A non-transitory machine-readable medium having instructions stored therein, which when executed by a processor, cause the processor to perform operations for managing security of a distributed system, the operations comprising:
   obtaining data processing systems information for data processing systems of the distributed system;
   using the data processing systems information to generate a weighted reputation for each of the data processing systems;
   generating a hierarchy for the distributed system based on the weighted reputations;
   validating, using the hierarchy, which of the data processing systems in the distributed system have authority over other ones of the data processing systems within the distributed system; and
   providing computer implemented services based on a result of the validating.

14. The non-transitory machine-readable medium of claim 13, wherein the data processing systems information comprises operational data and specification data of each of the data processing systems, wherein the operational data comprises a total run time, a traffic rate, a traffic latency, and an operating rule adherence rate of each of the data processing systems.

15. The non-transitory machine-readable medium of claim 14, wherein the operations further comprise:
   after using the hierarchy in the distributed system:
      identifying a compromised data processing system of the data processing systems of the distributed system;
      identifying a portion of the data processing systems that may be also compromised based on a representation of the data processing systems in the hierarchy;
      revising the hierarchy based on the portion of the data processing systems and the compromised data processing system to obtain a revised hierarchy;
      refreshing security data for the data processing systems using the revised hierarchy; and
      verifying communications obtained by the data processing systems using the refreshed security data.

16. The non-transitory machine-readable medium of claim 15, wherein the data processing systems implement a security framework based on the hierarchy, the security framework vesting security authority in each data processing system of the data processing systems over a portion of the data processing systems that are all lower in the hierarchy.

17. The non-transitory machine-readable medium of claim 16, wherein the hierarchy is further based on a spanning tree for the data processing systems, and the portion of the data processing systems are associated with child nodes of a node of the spanning tree associated with the data processing system that is vested with the security authority.

18. A data processing system, comprising:
- a processor; and
- a memory coupled to the processor to store instructions, which when executed by the processor, cause the processor to perform operations for managing security of a distributed system, the operations comprising:
  - obtaining data processing systems information for data processing systems of the distributed system;
  - using the data processing systems information to generate a weighted reputation for each of the data processing systems;
  - generating a hierarchy for the distributed system based on the weighted reputations;
  - validating, using the hierarchy, which of the data processing systems in the distributed system have authority over other ones of the data processing systems within the distributed system; and
  - providing computer implemented services based on a result of the validating.

19. The data processing system of claim 18, wherein the data processing systems information comprises operational data and specification data of each of the data processing systems, wherein the operational data comprises a total run time, a traffic rate, a traffic latency, and an operating rule adherence rate of each of the data processing systems.

20. The data processing system of claim 19, wherein a first data processing system of the data processing systems having a higher one of the weighted reputation than a second data processing system among of the data processing systems is higher within the hierarchy than the second data processing system.

\* \* \* \* \*